J. B. LADD.
METHOD AND MEANS FOR BRICK HACKING.
APPLICATION FILED OCT. 30, 1919.
1,418,003.
Patented May 30, 1922.
5 SHEETS—SHEET 2.
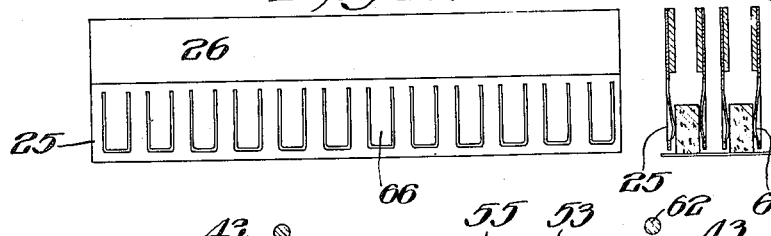
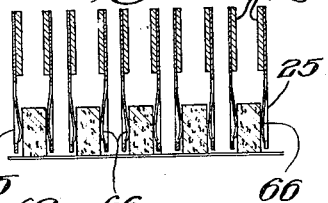
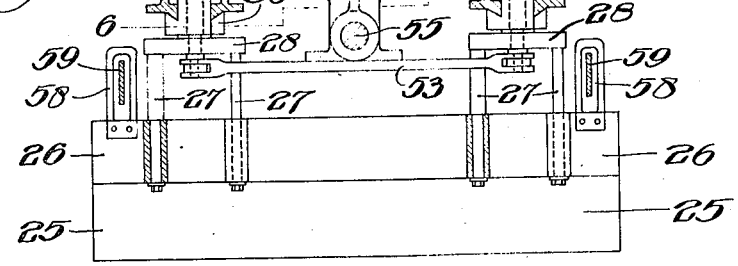
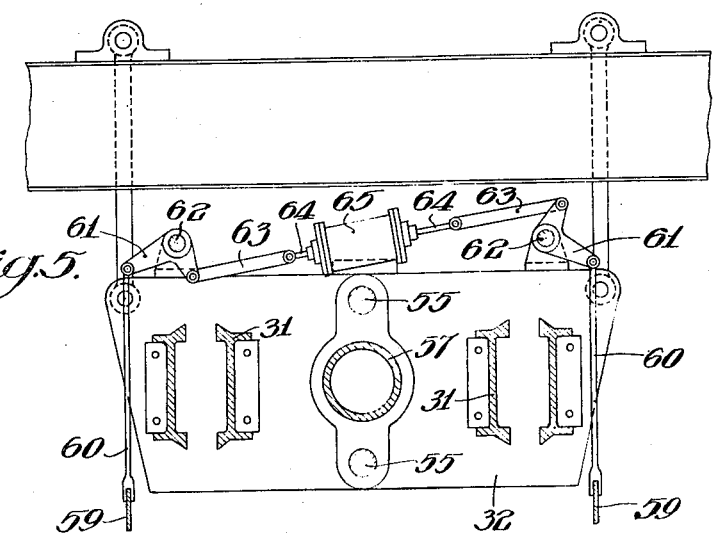
Inventor:
James B. Ladd.
By *Morewz, dale*
Attorney.

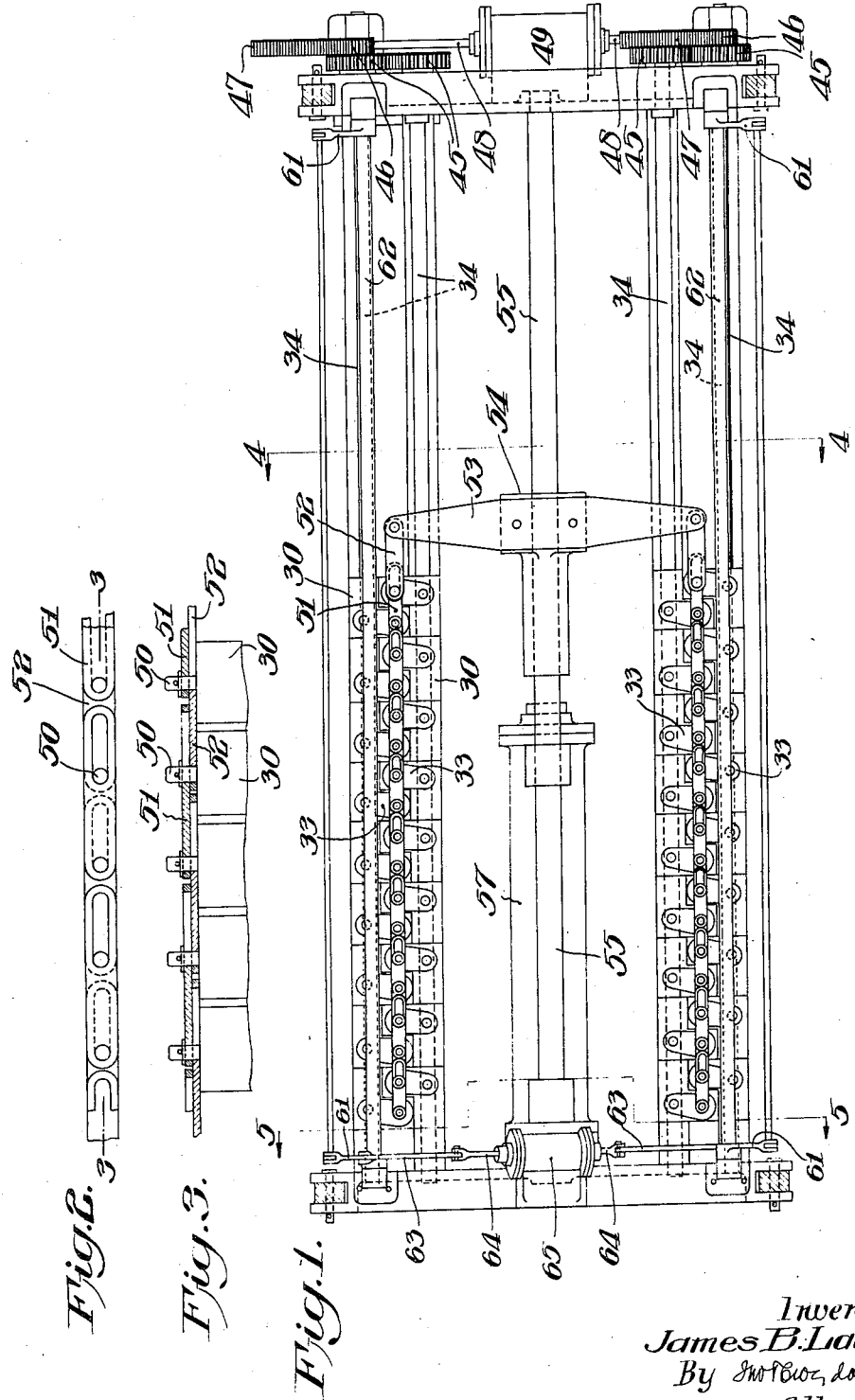

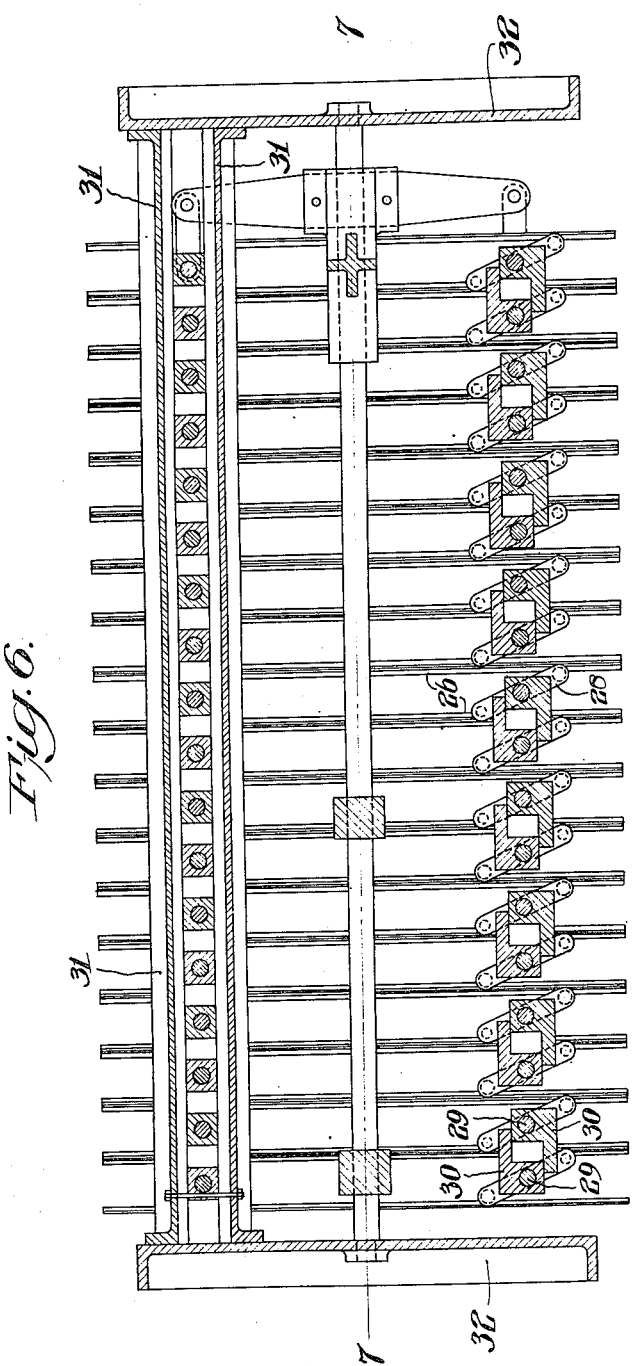

J. B. LADD.
METHOD AND MEANS FOR BRICK HACKING.
APPLICATION FILED OCT. 30, 1919.
1,418,003.
Patented May 30, 1922.
5 SHEETS—SHEET 4.
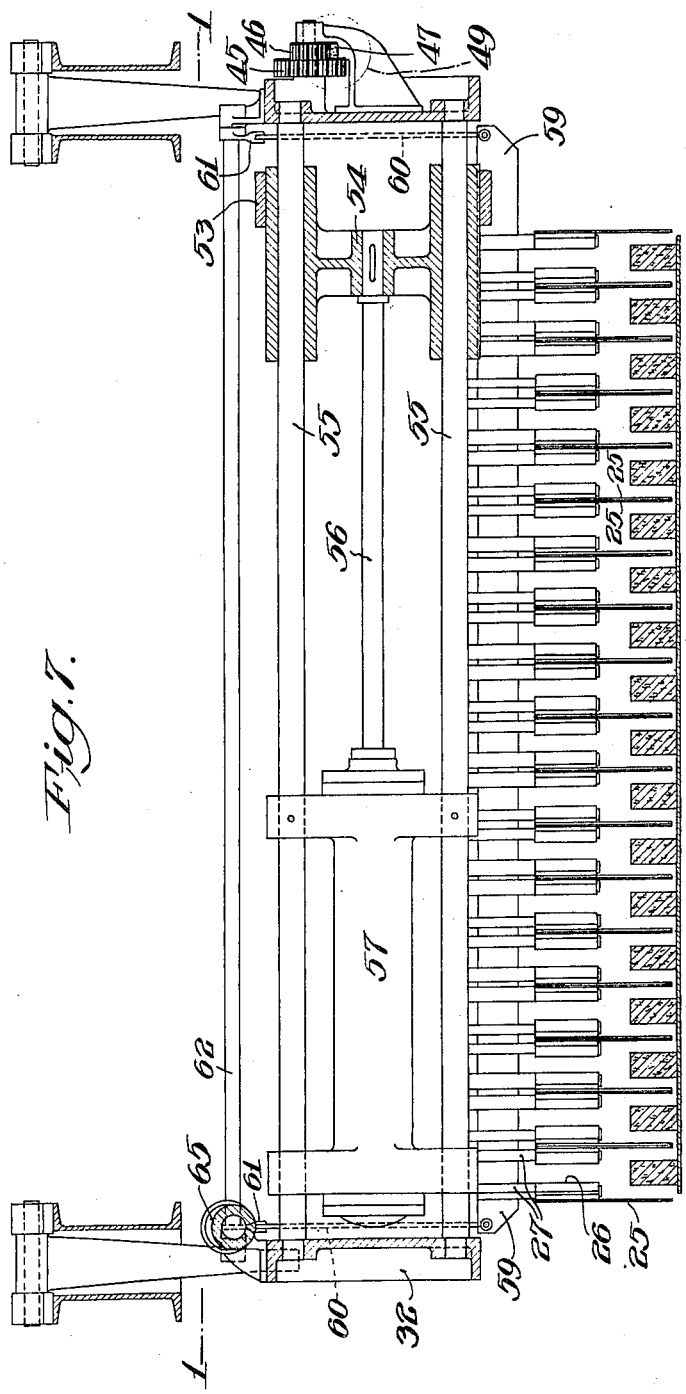
Inventor:
James B. Ladd,
By [signature]
Attorney.

Inventor:
James B. Ladd,
By *Attorney*

UNITED STATES PATENT OFFICE.

JAMES B. LADD, OF ARDMORE, PENNSYLVANIA.

METHOD AND MEANS FOR BRICK HACKING.

1,418,003.  Specification of Letters Patent.  Patented May 30, 1922.

Application filed October 30, 1919. Serial No. 334,409.

*To all whom it may concern:*

Be it known that I, JAMES B. LADD, a citizen of the United States, residing at Ardmore, in the county of Montgomery, State of Pennsylvania, have invented a new and useful Method and Means for Brick Hacking, of which the following is a specification.

This invention relates to improvements in method and means for hacking bricks, and comprises modifications and improvements in the method and means described and claimed in my co-pending application filed July 19, 1919, Serial No. 312,019.

Bricks are usually stacked on drying cars with a space of about one-half inch between the rows, but when assembled at rest on hacking tables, prior to transferring to drying cars, it is desirable that the space between the rows be materially greater than one-half inch (usually as much as two inches) to permit of the ready insertion between the rows of gripping plates or the like for lifting the bricks.

The means herein described and shown on the accompanying drawings provide for handling numerous rows of abutted bricks and constitute a lifting unit adapted to be handled by the crane means shown and described in my co-pending application referred to above, in place of the brick gripping units shown and described therein.

This invention provides a method and means for moving bricks assembled in long parallel abutted rows, with relatively wide spaces between the rows, and assembling the bricks on cars in hacked formation in relatively closely spaced rows.

This invention also provides methods and means for gripping bricks with a yielding pressure and other improvements.

Referring to the drawings, which illustrate, merely by way of example, suitable mechanism for effecting my invention:—

Fig. 1 is a sectional plan view taken on line 1—1 of Fig. 7.

Fig. 2 is a fragmentary detail in plan of the link connection.

Fig. 3 is a vertical section on line 3—3 of Fig. 2.

Fig. 4 is a vertical cross-section on line 4—4 of Fig. 1.

Fig. 5 is a vertical cross-section on line 5—5 of Fig. 1.

Fig. 6 is a horizontal section on line 6—6 of Fig. 4.

Fig. 7 is a longitudinal vertical section on line 7—7 of Fig. 6.

Fig. 15 is a side elevation and Fig. 16 is a cross-section of the clamping elements in modified form.

Similar numerals refer to similar parts throughout the several views.

Figures 8, 9:
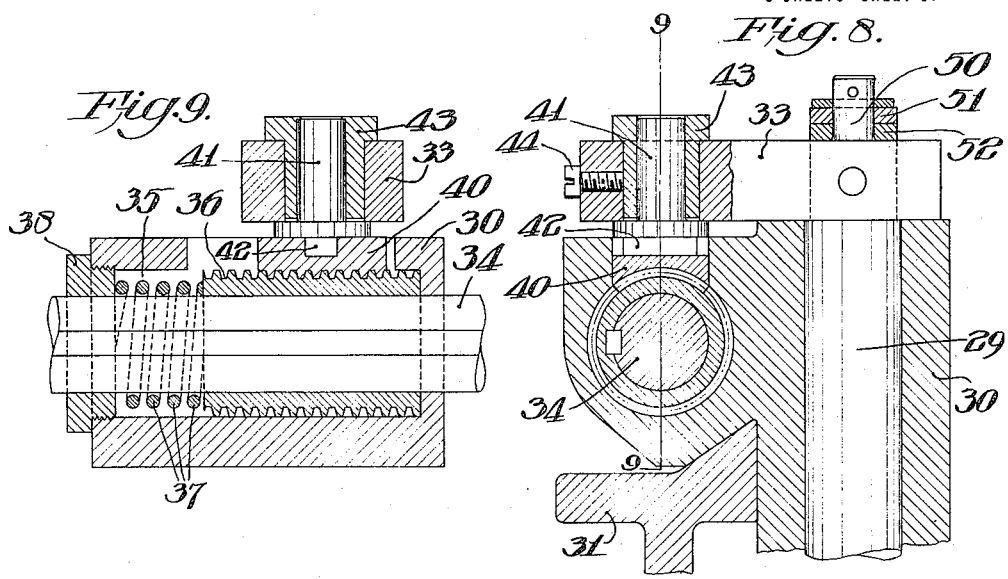
Fig. 8 is a sectional detail, on an enlarged scale, of a part of the upper structure shown in Fig. 4.
Fig. 9 is a transverse vertical section on line 9—9 of Fig. 8.

Referring to Fig. 4, the clamping plates 25 are attached to the bars 26 which are mounted on the pins 27 extending down from the levers 28 which are secured to the vertical shafts 29. These vertical shafts 29 are rotatably mounted in the bearing blocks 30. The bearing blocks 30 are slidably mounted on the beams 31 forming part of frame 32. The vertical shafts 29 are provided at their upper ends with the levers 33.

Through the upper ends of the bearing blocks 30 project the horizontal shafts 34. In a recess 35 in each bearing block 30 is provided the threaded sleeve 36 feathered on the shaft 34, see Figs. 8 and 9. A spring 37 surrounds shaft 34 between the end of the sleeve 36 and a plug 38, secured in the end of the recess 35. This spring 37 normally tends to hold the opposite end of the threaded sleeve 36 against the right hand end of the block 30, as shown in Fig. 9. A threaded nut 40 is provided to coöperate with the threaded sleeve 36 and is adapted to slide in a channel or way at the top of recess 35. A stud or pin 41 is provided with a projection or lug 42 having a sliding engagement with a slot in the top of nut 40. An eccentric bushing 43 is mounted on stud 41. This eccentric bushing projects through the end of lever 33 which is pinned to the shaft 29. The rotation of the threaded sleeve 36 causes a movement of the nut 40 and stud 41 for actuating the lever 33 and causing a partial rotation of the shaft 29 which operates, through the lever 28, to move the clamping plates 25 toward and away from each other. A set-screw 44 is provided in the end of lever 33 for locking the eccentric 43 in required position of adjustment, to secure the desired initial position of the lever 33 and consequently the initial position of the clamping plates 25.

The rotation of the shafts 34 is secured by the following mechanism:

The end of each shaft 34 is provided with a pinion 45, see Fig. 1, and beyond the pinion 45, on one of the shafts 34, is secured the pinion 46. Pinion 46 cooperates with the rack 47 which is connected to the piston rod 48 of a piston operating in the cylinder 49.

It will be noted that there are two racks 47 operated by the piston in cylinder 49 for actuating the two pairs of shafts 34.

Fluid pressure in the cylinder 49 actuates the racks to cause the rotation of each pair of shafts 34, to cause the cooperating clamping plates 25 to move toward and away from each other.

The purpose of the spring 37 is to permit a slight relative movement of the sleeve 36 within the bearing block 30 so as to give a limited yielding clamping pressure at each end of the clamping plates or elements 25.

At the upper ends of the shafts 29 are provided pins 50. Upon these pins are secured the slotted link members 51 and 52. These link members form chains which are connected to the ends of the cross-bars 53 which are mounted on the cross-head 54, which is slidably mounted on the rods 55. These cross-bars 53, it will be noted, are provided at the top and the bottom of the bearing blocks 30, as shown in Fig. 4, for the purpose of securing even stresses thereon.

The cross-head 54 is connected, by the piston rod 56, to the piston operating in the cylinder 57, so that fluid pressure exerted in said cylinder will move the cross-head to or away from the same.

Figure 10:
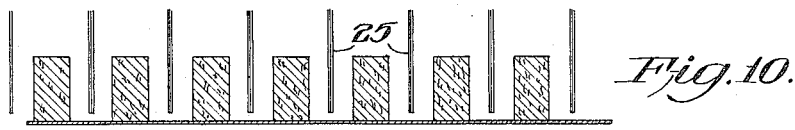
Figs. 10 to 14 are views of the bricks and clamping elements in different positions.

The movement of the cross-head 54 away from the cylinder carries the cross-bars from the position shown in Fig. 1 to the position shown in Figs. 6 and 7, thereby causing a separation of the bearing blocks 30, so that the clamping plates 25 will be relatively separated as in Fig. 10, to enter between the rows of bricks positioned in separated formation.

Figure 11:
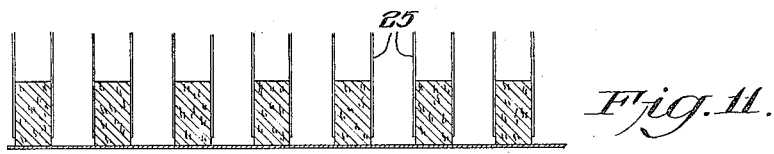

By operating the piston in cylinder 49, Fig. 1, the clamping plates 25 are brought together to secure or clamp the rows of bricks, as shown in Fig. 11.

Figure 12:
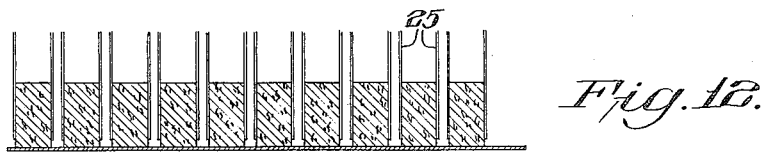
Figure 13:
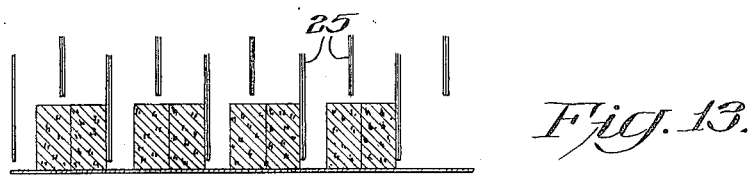
Figure 14:
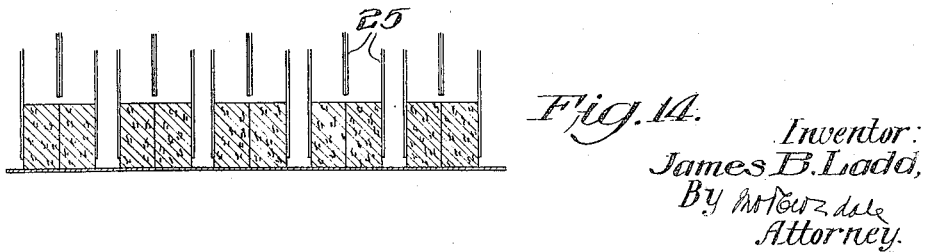

By then moving the piston in cylinder 57 to the left, the rows of bricks are brought into close formation, as shown in Fig. 12. The purpose of this arrangement is to provide ample means for the insertion of the clamping plates between the rows of bricks, as in Fig. 10, and then moving the rows into the desired close formation, for hacking, as in Fig. 12.

Where it is desired to clamp pairs of adjacent rows together, alternate pairs of clamping plates are lifted from between the rows, and the adjacent pairs of rows are moved together, as in Fig. 13, and then clamped, as in Fig. 14, or the pairs of rows are gripped and lifted before being moved together.

I show in Figs. 4 and 5, means for lifting said alternate pairs of clamping plates; for example alternate pairs of clamping plates 25 are provided with the loop formations 58, through which project the bars 59. These bars are connected by the rods 60 to the bell cranks 61, pivotally supported on the frame 32 at 62. The other end of bell crank 61 is connected by the link 63 with the piston rod 64 operated by the piston in cylinders 65. By introducing fluid pressure in cylinder 65 the bars 59 are lifted with the said alternate pairs of clamping plates 25.

In order to provide further means for resilient engagement of the rows of bricks, the clamping plates 25 may be provided, as shown in Figs. 15 and 16, with the resilient tongues 66, pressed out of the plane of the main plate extension, so that there will be a yielding pressure upon the bricks to allow for inequalities.

It will be noted that after shafts 34 have been rotated and the bricks thereby gripped by the plates 25, the bearing blocks may be moved together or apart without in anywise altering the grip of plates 25. I consider this feature of special importance, as it permits of moving the rows of bricks together or apart after they have been lifted from the hacking table and avoids a sliding of the rows of bricks over the hacking table, such as indicated in Figs. 11, 12 and 13.

Further, it will be noted that while the eccentric bushings 43 permit of adjusting the space between each pair of gripping plates, so that all the rows of bricks will be gripped at the same time by the several sets of gripping plates when the bricks are all of exactly the same thickness, when, as is usual in practice, the thickness of the several rows of bricks vary appreciably, the springs 35 will yield until all of the rows of bricks are gripped. Furthermore, on reference to Fig. 4 it will be noted that each gripping plate is moved by two pins 27 and that the yielding springs 35 therefore permit any pair of gripping plates to move out of parallel and to grip uniformly a row of bricks which is thicker at one end than at the other.

When handling a row of bricks in which the thickness of the bricks varies appreciably from each other, or in which the thickness of individual bricks varies appreciably, I use yielding gripping plates such as shown in Figs. 15 and 16, (Sheet 2) with one or more yielding parts bearing on each brick.

What I claim is:—

1. The method of hacking bricks which consists in first clamping the bricks, which have been assembled in long parallel abutted rows with relatively wide spaces between the rows, and moving the rows closer together and depositing said bricks on cars in hacked formation.

2. The method which consists in clamping a plurality of rows of bricks, in relatively separated formation, and then moving the rows into closer formation for hacking.

3. The method of hacking bricks which consists in first clamping the bricks, which have been assembled in long parallel abutted rows with relatively wide spaces between the rows, and depositing said bricks on cars in hacked formation, with adjacent rows closer together.

4. The method of hacking bricks which consists in first clamping the bricks, which have been assembled in long parallel abutted rows with relatively wide spaces between the rows, depositing said bricks on cars in hacked formation, and bringing adjacent rows into closer proximity during said operation.

5. The method of hacking bricks which have been assembled in a plurality of long parallel abutted rows with relatively wide spaces between the rows, which consists in first clamping the bricks and then adjacent rows into closer proximity and then depositing the rows on cars in hacked formation.

6. The method which consists in moving a plurality of separated rows of bricks into required position for hacking by first actuating alternate rows only, and then clamping adjacent rows together in pairs.

7. The method which consists in assembling a plurality of separated rows of bricks, then actuating alternate rows all in the same direction, then clamping adjacent rows together in pairs and then moving the same into required position for hacking.

8. The combination of a plurality of pairs of cooperating clamping elements, means for moving the clamping elements after clamping the bricks, to bring rows of bricks from a comparatively separated formation to position with the rows in closer formation for hacking.

9. The combination of a plurality of pairs of cooperating clamping elements, means for actuating said pairs to clamp the rows of bricks in comparatively separated formation and means for moving the clamping elements with the clamped brick into rows of closer formation.

10. The combination of a plurality of pairs of cooperating clamping elements, means for moving said pairs into relatively separated relationship, means for actuating said pairs into clamping relation with the bricks and means for moving said pairs with the bricks into closer formation.

11. The combination of a plurality of pairs of cooperating clamping elements, means for moving said pairs into relatively separated relationship for engaging with correspondingly separated rows of bricks and means for moving the said elements to bring the clamped rows into closer formation.

12. In a brick hacking machine the combination of a plurality of pairs of cooperating clamping elements, means for supporting and actuating same, means for moving the supporting means toward and away from each other, and means for moving cooperating pairs of clamping elements, after clamping the bricks, toward each other.

13. In a brick hacking machine the combination of a plurality of pairs of cooperating clamping elements, means for supporting and actuating same, means for moving the supporting means toward and away from each other, including spacing devices, and means for moving cooperating pairs of clamping elements with the clamped bricks toward each other.

14. In a brick hacking machine the combination of a plurality of pairs of cooperating clamping elements, means for supporting and actuating same, means for moving the supporting means toward and away from each other including fluid pressure operated devices, and means for moving cooperating pairs of clamping elements toward each other.

15. In a brick hacking machine the combination of a plurality of pairs of cooperating clamping elements, means for supporting and actuating same, means for moving the supporting means toward and away from each other, and means including gear and lever mechanism for moving cooperating pairs of clamping elements toward and away from each other.

16. In a brick hacking machine the combination of a plurality of pairs of cooperating clamping elements, means for supporting and actuating same, means for moving the supporting means toward and away from each other, and means for initial adjustment of the clamping elements, for moving cooperating pairs of clamping elements toward and away from each other.

17. In a brick hacking machine the combination of a plurality of pairs of cooperating clamping elements and means for actuating the same, said clamping elements having a plurality of resilient tongues pressed out of the plane of their main extension and adapted to yield at numerous points in contact with the row of bricks.

18. In a brick hacking device the combination of a supporting frame, bearing devices slidably mounted thereon, clamping elements and actuating shafts journaled in the bearing devices and supporting the clamping elements.

19. In a brick hacking device, the combination of a supporting frame, bearing devices slidably mounted thereon, clamping elements, actuating shafts journalled in the bearing devices and supporting the clamping elements, levers connected with the actuating shafts and gearing for communicating movement to the levers.

20. In a brick hacking device, the combination of a supporting frame, bearing devices slidably mounted thereon, clamping elements, actuating shafts journalled in the bearing devices and supporting the clamping elements, levers connected with the actuating shafts, means for communicating movement to the levers including fluid pressure operated devices.

21. In a brick hacking device, the combination of a supporting frame, bearing devices slidably mounted thereon, clamping elements, actuating shafts journalled in the bearing devices and supporting the clamping elements, levers connected with the actuating shafts, means for communicating movement to the levers, including fluid pressure operated devices and resilient means cooperating therewith.

22. In a brick hacking device, the combination of a supporting frame, bearing devices slidably mounted thereon, clamping elements, actuating shafts journalled in the bearing devices and supporting the clamping elements, levers connected with the actuating shafts and a gearing for communicating movement to the levers, and fluid pressure operated devices for communicating motion to the gearing, and resilient means operating in connection with the gearing.

23. In a brick hacking device, the combination of a supporting frame, bearing devices slidably mounted thereon, clamping elements, actuating shafts journalled in the bearing devices and supporting the clamping elements, levers connected with the actuating shafts, means for communicating movement to the levers, including an actuating device, and an adjustable eccentric device, interposed between the actuating means and the levers, for securing the initial position of the clamping elements.

24. In a brick hacking device, the combination of a supporting frame, bearing devices slidably mounted thereon, clamping elements, actuating shafts journalled in the bearing devices and supporting the clamping elements, levers connected with the actuating shafts, a gearing for communicating movement to the levers, and an adjustable eccentric device, interposed between the gearing and levers, for securing the initial position of the clamping elements.

JAMES B. LADD.